United States Patent
Athad

(10) Patent No.: US 12,491,565 B2
(45) Date of Patent: Dec. 9, 2025

(54) CUTTING INSERT HAVING TWO FORWARDLY CONVERGING ABUTMENT SURFACES, INSERT HOLDER AND CUTTING TOOL

(71) Applicant: ISCAR, LTD., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 494 days.

(21) Appl. No.: 18/145,167

(22) Filed: Dec. 22, 2022

(65) Prior Publication Data

US 2024/0207947 A1    Jun. 27, 2024

(51) Int. Cl.
*B23B 27/16*   (2006.01)
*B23B 29/04*   (2006.01)

(52) U.S. Cl.
CPC ...... *B23B 27/1611* (2013.01); *B23B 27/1622* (2013.01); *B23B 29/043* (2013.01); *B23B 2200/161* (2013.01); *B23B 2200/3627* (2013.01); *B23B 2200/369* (2013.01); *B23B 2220/12* (2013.01)

(58) Field of Classification Search
CPC ............. B23B 27/1611; B23B 27/1614; B23B 27/1622; B23B 27/1644; B23B 27/1651; B23B 27/1659; B23B 27/1666; B23B 27/1677; B23B 27/1681; B23B 27/1685; B23B 27/1696; B23B 29/043; B23B 29/06; B23B 2200/121; B23B 2200/126; B23B 2200/3618; B23B 2200/3627; B23B 2200/369; B23B 2205/04; B23B 2205/12; B23B 2220/12; B23B 2220/123
See application file for complete search history.

(56) References Cited

U.S. PATENT DOCUMENTS 6,428,247 B1 * 8/2002 Friedman .............. B23B 27/045
                                                          407/113
7,682,109 B2    3/2010 Hecht et al.
(Continued)

FOREIGN PATENT DOCUMENTS

DE    3321 184 A1    12/1984
EP    1657012 A1 *   5/2006  ............. B23B 27/08
(Continued)

OTHER PUBLICATIONS

International Search Report dated Feb. 19, 2024, issued in PCT counterpart application No. PCT/IL2023/051204.
(Continued)

*Primary Examiner* — Jennifer H Gay
(74) *Attorney, Agent, or Firm* — Womble Bond Dickinson (US) LLP

(57) ABSTRACT

A cutting insert includes opposing insert first and second side surfaces. The insert first side surface includes a first mounting arrangement. The first mounting arrangement includes a) at least one first side abutment surface facing away from the insert second side surface, b) a first stopper abutment surface oriented transversely to the at least one first side abutment surface and c) two opposite-facing first wedge abutment surfaces oriented transversely to the at least one first side abutment surface and converging forwardly. An insert holder has a corresponding pocket mounting arrangement for engagement with the first mounting arrangement.

42 Claims, 7 Drawing Sheets

(56) References Cited

U.S. PATENT DOCUMENTS

| | | | | |
|---|---|---|---|---|
| 8,529,166 | B2* | 9/2013 | Hecht | B23B 29/043 |
| | | | | 407/103 |
| 9,079,252 | B2* | 7/2015 | Hecht | B23B 27/04 |
| 9,821,376 | B2* | 11/2017 | Tsuda | B23B 27/141 |
| 9,901,986 | B2* | 2/2018 | Makhlin | B23B 27/1622 |
| 10,239,123 | B2* | 3/2019 | Kertsman | B23B 27/04 |
| 10,646,926 | B2* | 5/2020 | Kemmler | B23B 27/1622 |
| 11,325,192 | B2* | 5/2022 | Morgulis | B23B 27/1662 |
| 11,642,726 | B2* | 5/2023 | Suzuki | B23B 27/007 |
| | | | | 407/114 |
| 11,759,867 | B2* | 9/2023 | Suzuki | B23B 27/1614 |
| | | | | 407/113 |
| 11,806,793 | B2* | 11/2023 | Athad | B23B 29/043 |
| 2011/0110733 | A1* | 5/2011 | Hecht | B23B 27/1614 |
| | | | | 407/103 |
| 2014/0072379 | A1 | 3/2014 | Hecht | |
| 2014/0199128 | A1* | 7/2014 | Hecht | B23B 27/1622 |
| | | | | 407/103 |
| 2017/0066060 | A1* | 3/2017 | Tsuda | B23B 27/141 |
| 2017/0232524 | A1* | 8/2017 | Makhlin | B23B 27/1622 |
| | | | | 407/114 |
| 2018/0281075 | A1* | 10/2018 | Kertsman | B23B 27/1622 |
| 2018/0361486 | A1* | 12/2018 | Kemmler | B23B 27/1622 |
| 2020/0047259 | A1* | 2/2020 | Morgulis | B23B 27/1622 |
| 2022/0258252 | A1* | 8/2022 | Suzuki | B23B 27/1622 |
| 2022/0331883 | A1* | 10/2022 | Suzuki | B23B 27/1614 |
| 2023/0137637 | A1* | 5/2023 | Athad | B23B 29/043 |
| | | | | 407/113 |
| 2023/0234143 | A1* | 7/2023 | Fukuhara | B23B 27/143 |
| 2024/0123516 | A1* | 4/2024 | Hecht | B23B 27/10 |
| 2024/0207947 | A1* | 6/2024 | Athad | B23B 29/043 |

FOREIGN PATENT DOCUMENTS

| | | | | |
|---|---|---|---|---|
| EP | 1657012 | B1 | 1/2012 | |
| EP | 3421159 | A1 * | 1/2019 | B23B 29/043 |

OTHER PUBLICATIONS

Written Opinion dated Feb. 19, 2024, issued in PCT counterpart application No. PCT/IL2023/051204.

* cited by examiner

CUTTING INSERT HAVING TWO FORWARDLY CONVERGING ABUTMENT SURFACES, INSERT HOLDER AND CUTTING TOOL

FIELD OF THE INVENTION

The subject matter of the present application relates to cutting tools, and in particular, to grooving and parting cutting tools, and further in particular, to face grooving cutting tools of the type in which a cutting insert is removably attached to an insert holder by a fastening member.

BACKGROUND OF THE INVENTION

A cutting tool for grooving metalworking operations may comprise a cutting insert removably attached to an insert holder. More precisely, the insert holder has a lateral insert pocket and the cutting insert is releasably retained in the insert pocket.

During said metalworking operations a cutting force is applied on the cutting insert at the cutting edge. The direction of the cutting force is substantially downwards and somewhat inwards towards the central body. The said cutting force generates a torque about a pivot point, the pivot point typically being a forwardmost abutment point between a lower surface of the cutting insert and a lower supporting surface of the insert holder. The torque forces the cutting insert to rotate in a rotational direction about the pivot point. To prevent the rotational displacement of the cutting insert, the insert pocket has at least one stopper abutment surface, that faces against the rotational direction. Examples of such cutting tools are disclosed in, for example, U.S. Pat. No. 7,682,109 and EP1657012 B1.

It is an object of the subject matter of the present application to provide a new and improved cutting insert.

It is another object of the subject matter of the present application to provide a new and improved cutting tool.

It is a further object of the subject matter of the present application to provide a new and improved coupling of a replaceable cutting insert in an insert holder.

SUMMARY OF THE INVENTION

In accordance with a first aspect of the subject matter of the present application there is provided a replaceable cutting insert having an insert longitudinal axis defining opposite forward and rearward directions, the cutting insert comprising:

opposing insert front and rear end surfaces and an insert peripheral surface extending therebetween, the insert peripheral surface comprising opposing insert first and second side surfaces and opposing insert upper and lower surfaces connecting the insert first and second side surfaces;

a forwardly disposed first cutting portion comprising a first cutting edge formed at the intersection of the insert front end surface and the insert upper surface; and a mounting portion connected to the first cutting portion, the mounting portion comprising:
  an insert through bore extending along a through bore axis and opening out to the insert first and second side surfaces; and
  a first mounting arrangement formed on the insert first side surface and comprising:
    at least one first side abutment surface facing away from the insert second side surface;
    a first stopper abutment surface oriented transversely to the at least one first side abutment surface; and
    two opposite-facing first wedge abutment surfaces oriented transversely to the at least one first side abutment surface and converging towards each other at an acute first wedge angle in a direction towards the first cutting edge; wherein:
    the first stopper abutment surface is spaced apart from, and distinct from, both of the two first wedge abutment surfaces; and
    the first stopper abutment surface is further from the first cutting edge than the two first wedge abutment surfaces.

In accordance with a second aspect of the subject matter of the present application there is provided an insert holder having a holder longitudinal axis defining opposite forward and rearward directions, the insert holder comprising:

a holder forward end surface and a holder peripheral surface forming a circumferential boundary thereof, the pocket peripheral surface extending about the holder longitudinal axis and comprising at the holder forward end opposing holder pocket near-side and far-side surfaces; and a forwardly disposed insert pocket recessed in the holder pocket near-side surface, the insert pocket comprising:
  a pocket opening that opens out to the holder forward end surface;
  a pocket base surface;
  a threaded pocket bore extending along a threaded bore axis and opening out to the pocket base surface;
  a pocket mounting arrangement formed on the pocket base surface and comprising:
    at least one pocket side abutment surface facing away from the holder pocket far-side surface;
    a pocket stopper abutment surface oriented transversely to the at least one pocket side abutment surface; and
    two opposite-facing pocket wedge abutment surfaces oriented transversely to the at least one pocket side abutment surface and converging towards each other at an acute pocket wedge angle in a direction towards the pocket opening; wherein:
    the pocket stopper abutment surface is spaced apart from, and distinct from, both of the two pocket wedge abutment surfaces; and
  the pocket stopper abutment surface is further from the pocket opening than the two pocket wedge abutment surfaces.

In accordance with a third aspect this aspect of the subject matter of the present application there is provided a cutting tool comprising, in combination:
  an insert holder having a holder longitudinal axis defining opposite forward and rearward directions; and
  a cutting insert, of the type described above, removably attached to the insert holder by a fastening member.

It is understood that the above-said is a summary, and that features described hereinafter may be applicable in any combination to the subject matter of the present application, for example, any of the following features may be applicable to the rotary cutting tool, cutting insert or insert holder:

The first wedge angle can be in the range $35° \leq \alpha \leq 65°$.

The two first wedge abutment surfaces can be planar.

The first stopper abutment surface can be planar.

The first stopper abutment surface can be parallel to the insert longitudinal axis.

The two first wedge abutment surfaces can comprise a first wedge upper abutment surface and a first wedge lower abutment surface, the first wedge upper abutment surface being closer to the insert upper surface than the first wedge lower abutment surface.

The cutting insert can further comprise an insert median plane containing the insert longitudinal axis and the through bore axis. The first stopper abutment surface can be located on the same side of the insert median plane as the first wedge upper abutment surface.

The cutting insert can further comprise an insert pivot axis extending through the insert first and second side surfaces and intersecting the first wedge lower abutment surface, about which a first pivot direction is defined by a cutting force applied to the first cutting edge. The first stopper abutment surface can face in the first pivot direction.

The two first wedge abutment surfaces can face away from each other.

The first mounting arrangement can further comprise a first projection projecting in a direction away from the at least one first side abutment surface. The two first wedge abutment surfaces can be located on the first projection.

The first stopper abutment surface can be located on the first projection.

The two first wedge abutment surfaces and the first stopper abutment surface can be angularly spaced apart about the through bore axis.

The at least one first side abutment surface can comprise three spaced apart first side abutment surfaces, the three first side abutment surfaces being angularly spaced apart about the through bore axis.

The at least one first side abutment surface can be planar.

The two first wedge abutment surfaces can be planar. The two first wedge abutment surfaces can each form an external first wedge side angle with the at least one first side abutment surface, each first wedge side angle fulfilling the condition: $90° \leq \beta \leq 100°$.

The first stopper abutment surface can be planar. The first stopper abutment surface can form an external first stopper side angle with the at least one first side abutment surface, the first stopper side angle fulfilling the condition: $90° \leq \theta \leq 100°$.

Measured in a direction along the through bore axis, the first stopper abutment surface can be wider than both of the two first wedge abutment surfaces.

The cutting insert can further comprise a rearwardly disposed second cutting portion comprising a second cutting edge formed at the intersection of the insert rear end surface and the insert upper surface. The mounting portion can be connected to the second cutting portion, the mounting portion further comprising a second mounting arrangement formed on the insert second side surface, the second mounting arrangement comprising i) at least one second side abutment surface facing away from the insert first side surface, ii) a second stopper abutment surface oriented transversely to the at least one second side abutment surface, iii) two opposite-facing second wedge abutment surfaces oriented transversely to the at least one second side abutment surface and converging towards each other in a direction towards the second cutting edge at a second wedge angle. The second stopper abutment surface can be spaced apart from, and distinct from, both of the two second wedge abutment surfaces. The two second wedge abutment surfaces can be closer to the second cutting edge than the second stopper abutment surface.

The cutting insert can exhibit 180° rotational symmetry about an insert vertical axis oriented perpendicular to the insert longitudinal axis and extending through the insert upper and lower surfaces.

The pocket wedge angle can be in the range $35° \leq \mu \leq 65°$.

The two pocket wedge abutment surfaces can be planar.

The pocket stopper abutment surface can be planar.

The pocket stopper abutment surface can be parallel to the holder longitudinal axis.

The two pocket wedge abutment surfaces can comprise a pocket wedge upper abutment surface and a pocket wedge lower abutment surface, the pocket wedge upper abutment surface being closer to the holder upper surface than the pocket wedge lower abutment surface.

The insert holder can further comprise a holder median plane containing the holder longitudinal axis and the threaded bore axis. The pocket peripheral surface at the holder forward end can further comprise opposing holder upper and lower surfaces connecting the holder pocket near-side and far-side surfaces. The pocket stopper abutment surface can be on the same side of the holder median plane as the pocket wedge upper abutment surface.

The pocket peripheral surface at the holder forward end can further comprise opposing holder upper and lower surfaces connecting the holder pocket near-side and far-side surfaces. The insert holder can further comprise a pocket pivot axis extending through the holder pocket near-side and far-side surfaces and intersecting the pocket wedge lower abutment surface, about which a pocket pivot direction is defined by a cutting force applied to a first cutting edge of a cutting insert removably attached to the insert holder by a fastening member. The pocket stopper abutment surface can face opposite the pocket pivot direction.

The pocket wedge upper abutment surface can be further forward than the pocket wedge lower abutment surface.

The two pocket wedge abutment surfaces can face towards each other.

The pocket mounting arrangement can further comprise a pocket recess recessed in a direction away from the at least one pocket side abutment surface. The two pocket wedge abutment surfaces can be located in the pocket recess.

The pocket stopper abutment surface can be located in the pocket recess.

The two pocket wedge abutment surfaces and the pocket stopper abutment surface can be angularly spaced apart about the threaded bore axis.

The pocket side abutment surface can comprise three spaced apart pocket side abutment surfaces, the three pocket side abutment surfaces being angularly spaced apart about the threaded bore axis.

The at least one pocket side abutment surface can be planar.

The two pocket wedge abutment surfaces can be planar. The two pocket wedge abutment surfaces can each form an internal pocket wedge side angle with the pocket side abutment surface, each pocket wedge side angle fulfilling the condition: $90° \leq \gamma \leq 100°$.

The pocket stopper abutment surface can be planar. The pocket stopper abutment surface can form an internal pocket stopper side angle with the pocket side abutment surface, the pocket stopper side angle fulfilling the condition: $90° \leq \delta \leq 100°$.

Measured in a direction along the threaded bore axis, the pocket stopper abutment surface can be wider than both of the two pocket wedge abutment surfaces.

Each pocket wedge abutment surface can abut a respective first wedge abutment surface, the pocket stopper abutment surface can abut the first stopper abutment surface and the at least one pocket side abutment surface can abut the at least one first side abutment surface.

The fastening member can be a retaining screw that is located in the insert through bore and threadingly engaged with the threaded pocket bore.

The insert upper and lower surfaces surface and the insert front and rear surfaces can be spaced apart from any and all surfaces of the insert pocket.

The insert wedge angle can be equal to the pocket wedge angle.

BRIEF DESCRIPTION OF THE FIGURES

For a better understanding of the present application and to show how the same may be carried out in practice, reference will now be made to the accompanying drawings, in which.

Figure 1:
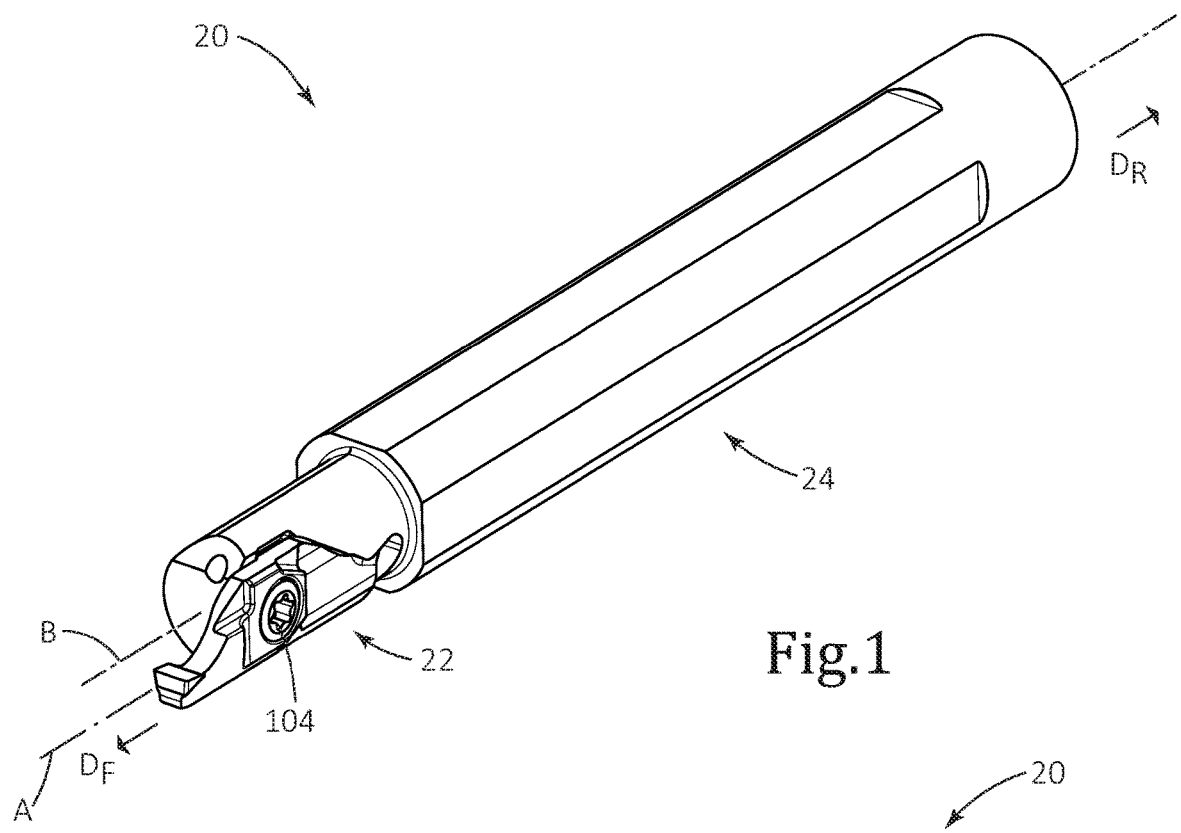
FIG. 1 is a perspective view of a cutting tool showing a cutting insert and an insert holder.
Figure 2:
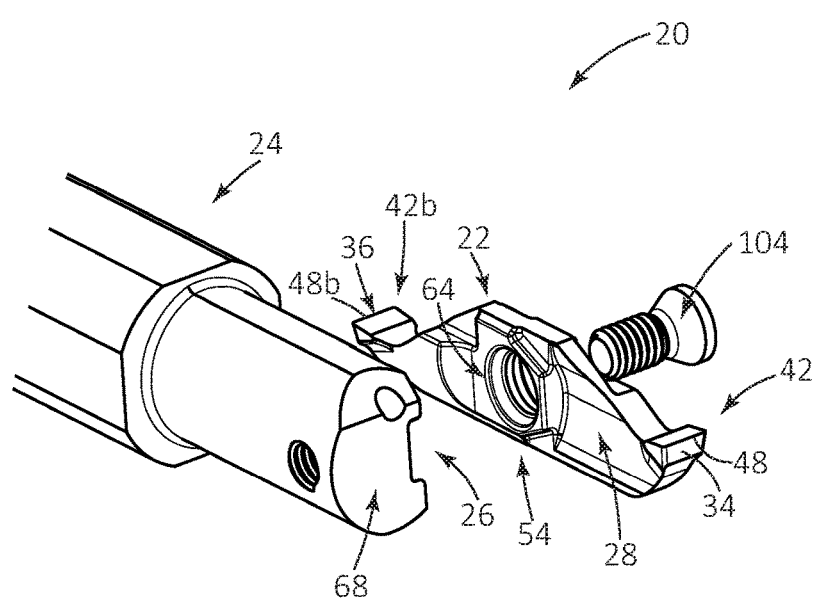
FIG. 2 is an exploded view of a forward end of the cutting tool shown in FIG. 1.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1 showing a cutting tool 20, of the type used for grooving, more precisely face grooving, in accordance with an embodiment of the subject matter of the present application. The cutting tool 20 has a replaceable cutting insert 22, 122 and an insert holder 24. The cutting tool 20 is adjustable between an assembled position and an unassembled position. In the assembled position of the cutting tool 20, the cutting insert 22, 122 is removably retained in an insert pocket 26 of the insert holder 24.

The insert holder 24 may be made of a first hard material and the cutting insert 22, 122 of a second hard material that is harder than the first hard material. For example, the insert holder 24 may be made of steel and the cutting insert 22, 122 may be made of cemented carbide.

Figure 3:
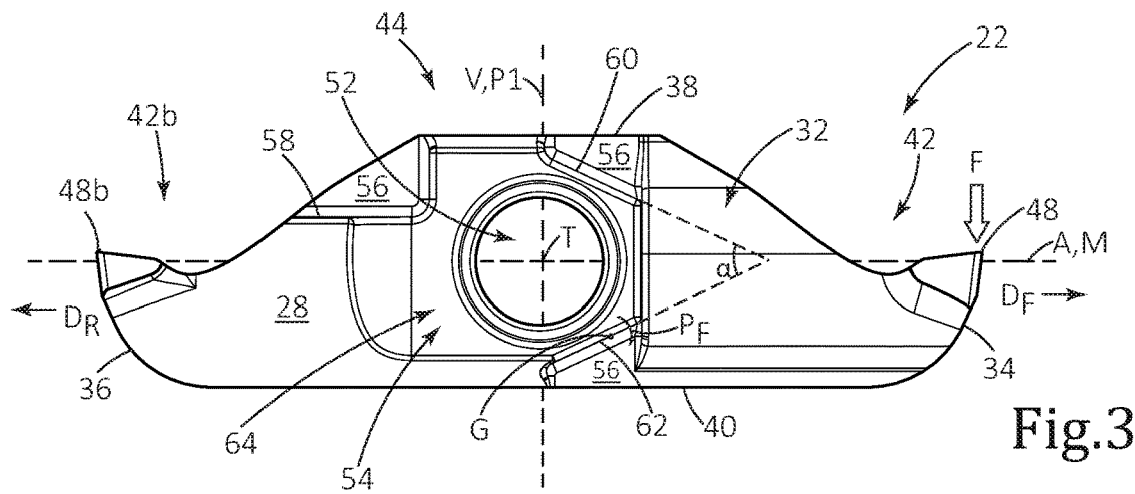
FIG. 3 is a first side view of the cutting insert shown in FIG. 1, in accordance with a first embodiment, showing the first mounting arrangement.

Making reference to FIGS. 2 to 9, a first aspect of the subject matter of the present application relates to the cutting insert 22, 122. The cutting insert 22, 122 has an insert longitudinal axis A that defines opposite forward and rearward directions $D_F$, $D_R$. The cutting insert 22, 122 includes opposing insert front and rear end surfaces 34, 36 and an insert peripheral surface 32 that extends therebetween. The insert peripheral surface 32 extends circumferentially about, and faces away from, the insert longitudinal axis A. The insert peripheral surface 32 includes opposing insert first and second side surfaces 28, 30 that connect opposing insert upper and lower surfaces 38, 40. The insert longitudinal axis A passes between the insert first and second surfaces 28, 30. Generally speaking, the insert longitudinal axis A can intersect the insert front and rear end surfaces 34, 36. It is noted however that, as is known in the field of face grooving, a portion of the insert upper surface 38 can slope towards (and optionally beyond) the insert longitudinal axis A in the forward direction $D_F$ (and the rearward direction $D_R$, in a double-ended configuration as discussed below, as seen in FIG. 3). In such a configuration, the insert longitudinal axis A can intersect the insert upper surface 38 as opposed to the insert front end surface 34 (and the insert rear end surface 36, in the double-ended configuration). 22, 122. The cutting insert 22, 122 has an insert axial plane P that contains the insert longitudinal axis A and passes between the insert first and second side surface 28, 30.

It should be noted that use of the terms "forward" and "rearward" throughout the description and claims refer to a relative position in a direction of the insert longitudinal axis A towards the right and left, respectively, in FIGS. 3-5 and 8-9. It should also be noted that use of the terms "upward" and "downward" throughout the description and claims refer to a relative position in a direction perpendicular to the insert longitudinal axis A towards the top and bottom, respectively, in FIGS. 3 and 8.

The cutting insert 22, 122 includes a forwardly disposed first cutting portion 42 and a mounting portion 44, connected to the first cutting portion 42. In accordance with a first embodiment of the subject matter of the present application (FIGS. 3-6), the cutting insert 22, 122 may be two-way indexable. Specifically, the cutting insert 22 can be double-ended, with a rearwardly displaced second cutting portion 42b connected to the mounting portion 44. The second cutting portion 42b is located at a rear end of the cutting insert 22. Alternatively, in accordance with a second embodiment of the subject matter of the present application (FIGS. 7-9), the cutting insert 122 may be non-indexable, that is single-ended, with exactly one cutting portion 42 located at a forward end of the cutting insert 122 and the mounting portion 44 located at a rear end of the cutting insert 122.

Referring now to FIG. 3, the first cutting portion 42 includes a first cutting edge 48, for grooving/parting metal cutting operations, formed at the intersection of the insert front end surface 34 and the insert upper surface 38. The insert upper surface 38 includes a first rake surface 50 which extends from the first cutting edge 48.

Figure 6:
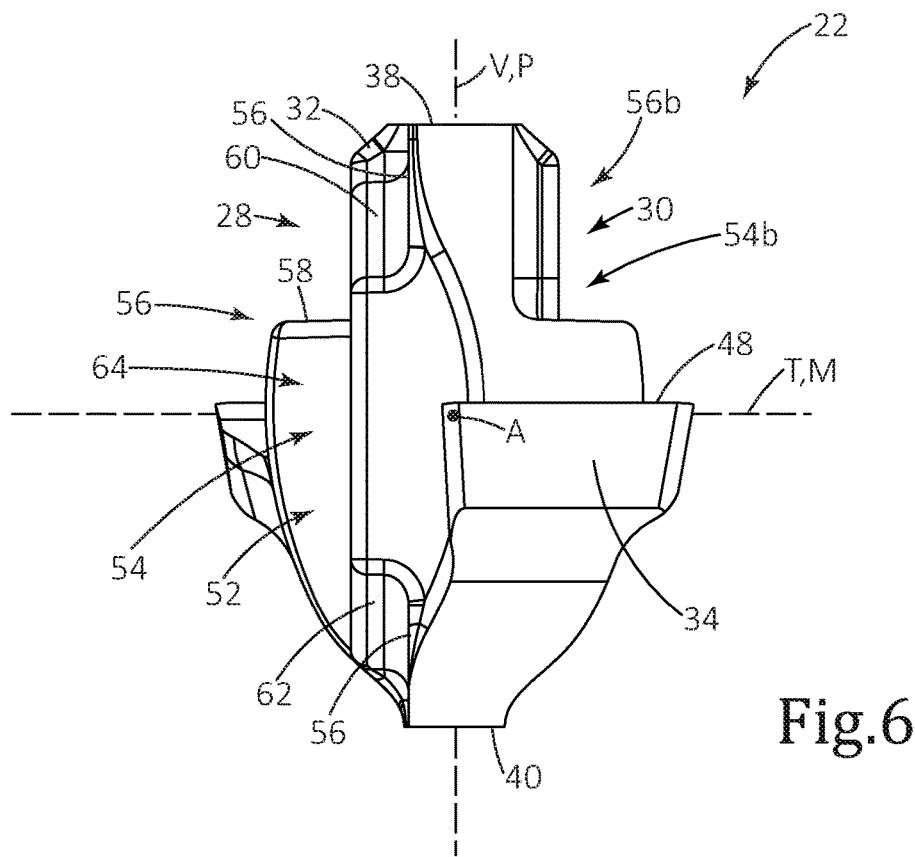
FIG. 6 is a front view of the cutting insert shown in FIG. 2.
Figure 7:
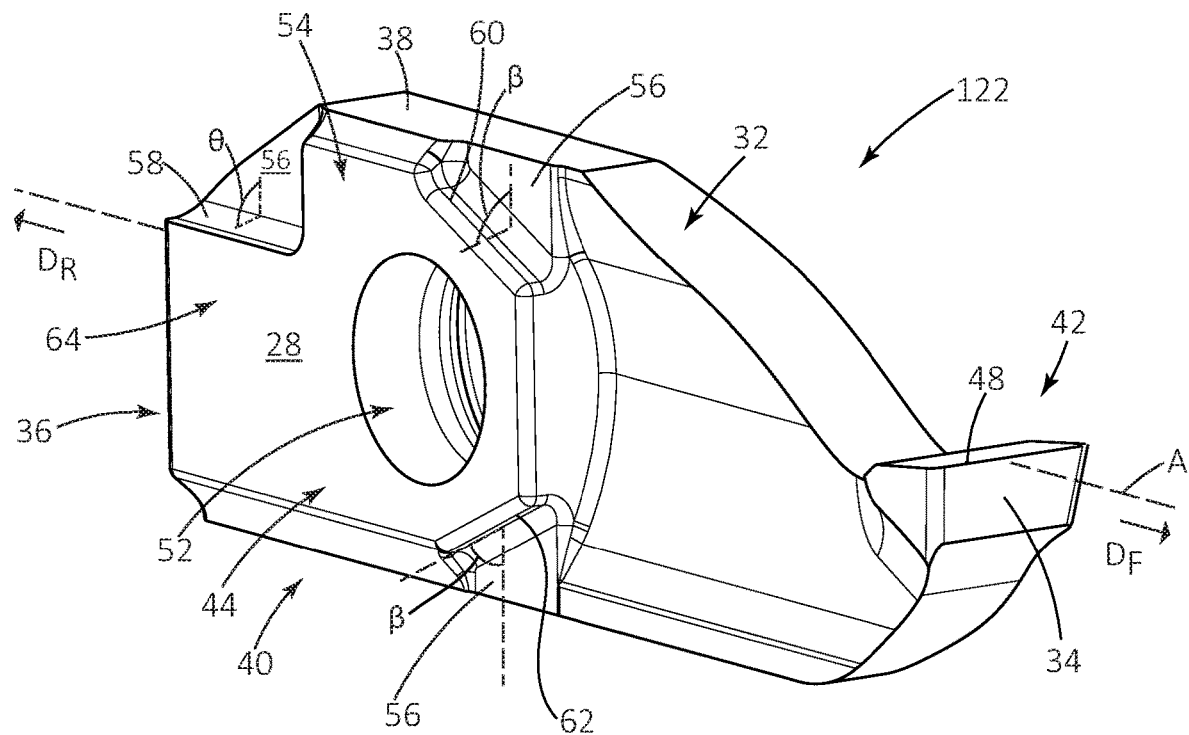
FIG. 7 is a perspective view of another cutting insert, in accordance with a second embodiment.

Making reference to FIG. 6, in accordance with some embodiments of the subject matter of the present application, the insert first and second side surfaces 28, 30 at the first cutting portion 42 can be curved in a front view of the cutting insert 22, 122 to allow for face grooving of a radiused groove. Beneficially, as mentioned earlier, a portion of the insert upper surface 38 can slope towards the insert longitudinal axis A in the forward direction $D_F$ so that the first cutting edge 48 is located in a midway portion of the cutting insert 22, 122.

Figure 3A:
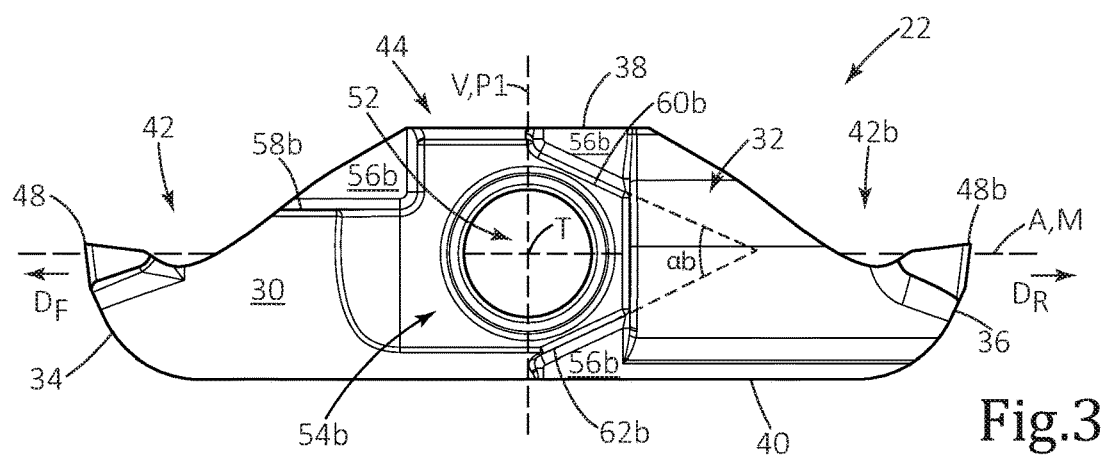
FIG. 3A is a second side view of the cutting insert shown in FIG. 2, showing the second mounting arrangement.
Figure 4:
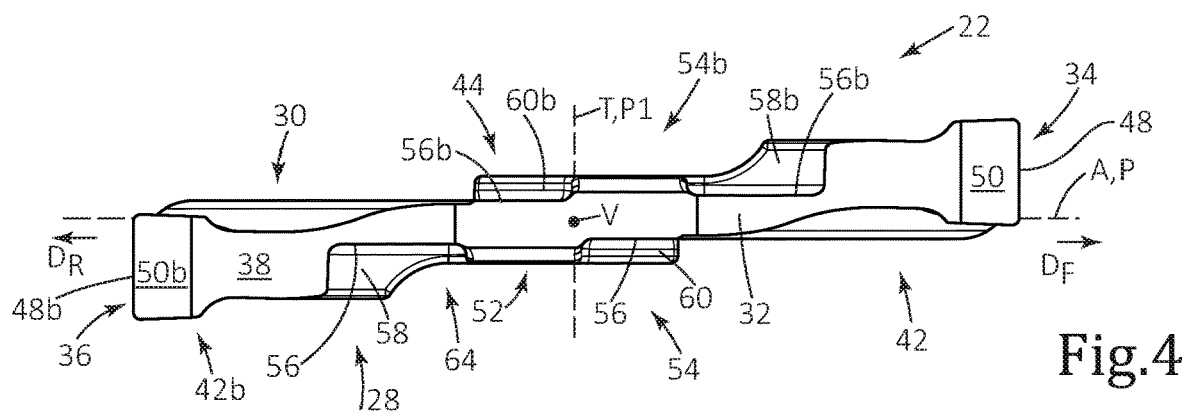
FIG. 4 is a top view of the cutting insert shown in FIG. 2.
Figure 5:
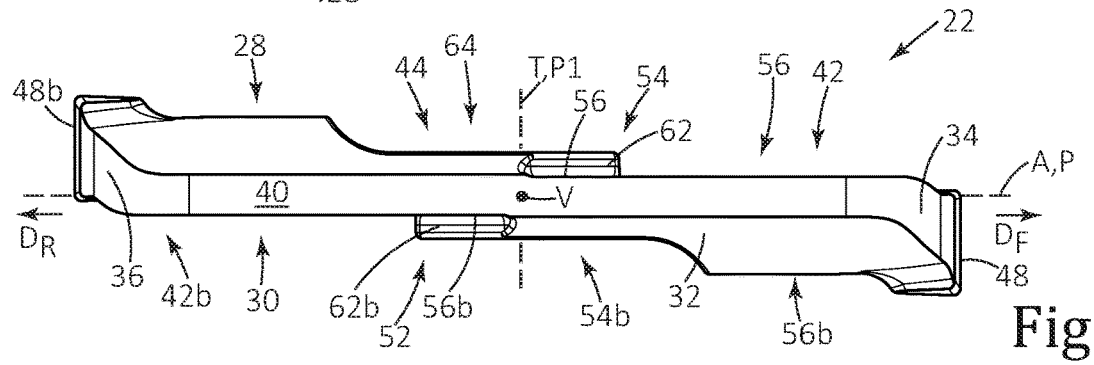
FIG. 5 is a bottom view of the cutting insert shown in FIG. 2.

Reverting to FIGS. 3-3A, in accordance with some embodiments of the subject matter of the present application, the mounting portion 44 can include an insert through bore 52 that opens out to the insert first and second side surfaces 28, 30 and extends along a through bore axis T. The through bore axis T can intersect the insert longitudinal axis A and be perpendicular thereto. The through bore axis T can pass between insert upper and lower surfaces 38, 40 and also the insert front and rear end surfaces 34, 36. As shown in FIGS. 4 and 5, the insert axial plane P can be perpendicular to the through bore axis T. The cutting insert 22, 122 has an insert median plane M which is perpendicular to the insert axial plane P and contains the insert longitudinal axis A and the through bore axis T.

The mounting portion 44 includes a first mounting arrangement 54 formed on the insert first side surface 28. It is understood that the first mounting arrangement 54 is separate from the insert through bore 52. That is to say, the insert through bore 52 does not constitute any part of the first mounting arrangement 54.

The first mounting arrangement 54 includes at least one first side abutment surface 56 which faces away from the insert second side surface 30. The at least one first side abutment surface 56 is designed to abut a corresponding surface in the insert pocket 26. In accordance with some embodiments of the subject matter of the present application, the at least one first side abutment surface 56 can be planar. The at least one first side abutment surface 56 can include three spaced apart first side abutment surfaces 56. The three first side abutment surfaces 56 can be angularly spaced apart about the through bore axis T. The three first side abutment surface 56 can be parallel, and optionally co-planar, with each other.

In accordance with some embodiments of the subject matter of the present application, the first mounting arrangement 54 can include a first projection 64 which projects in a direction away from the at least one first side abutment surface 56. The purpose of the projection is described later in the description. In accordance with some embodiments of the subject matter of the present application, the first projection 64 can project from the at least one first side abutment surface 56. The insert through bore 52 can open out to a crest portion of the insert projection 64.

Figure 15:
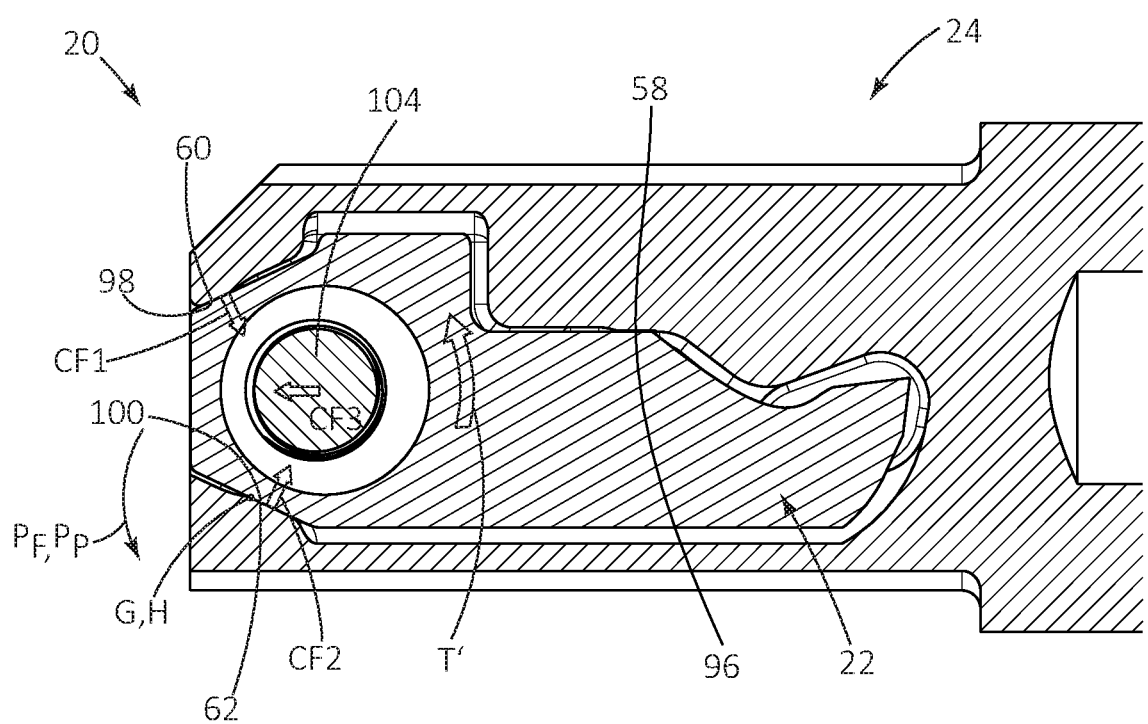
FIG. 15 is a cross sectional view taken along lines XV-XV shown in FIG. 14.

The first mounting arrangement 54 includes two opposite-facing first wedge abutment surfaces 60, 62. As seen in a side view of the insert (e.g., FIGS. 3-3A), the two opposite-facing first wedge abutment surfaces 60, 62 are located on opposite sides of the median plane M, and face in generally opposite directions. The two opposite-facing first wedge abutment surfaces 60, 62 are designed to abut corresponding surfaces in the insert pocket 26. It is noted that the first wedge abutment surfaces 60, 62 are spaced apart from the insert upper and lower surfaces 38, 40. In accordance with some embodiments of the subject matter of the present application, the two first wedge abutment surfaces 60, 62 can include a first wedge upper abutment surface 60 and a first wedge lower abutment surface 62, whereby the first wedge upper abutment surface 60 is closer to the insert upper surface 38 than the first wedge lower abutment surface 62. Referring to FIG. 15, the cutting insert 22, 122 can include an insert pivot axis G which extends through the insert first and second side surfaces 28, 30 and intersects the first wedge lower abutment surface 62. Referring also to FIG. 15, a first pivot direction $P_F$ about the insert pivot axis G is defined by a (downward and slightly rearward) cutting force F applied to the first cutting edge 48.

It should be noted that use of the term "opposite-facing" throughout the description and claims refers to two surfaces that either face towards each other or alternatively face away from each other. Stated differently, generally speaking, the two said surfaces face in opposite directions.

The two first wedge abutment surfaces 60, 62 are oriented transversely to the at least one first side abutment surface 56. In accordance with some embodiments of the subject matter of the present application, the two first wedge abutment surfaces 60, 62 can face away from each other. The two first wedge abutment surfaces 60, 62 can be located on the first projection 64.

In accordance with some embodiments of the subject matter of the present application, the two first wedge abutment surfaces 60, 62 can be planar. The two first wedge abutment surfaces 60, 62 can each form an external first wedge side angle β with the at least one first side abutment surface 56. Each first wedge side angle β can fulfil the condition: $90° \leq β \leq 100°$. Preferably, each first wedge side angle β can fulfil the condition: $90° \leq β \leq 93°$. Preferably still, each first wedge side angle β can fulfil the condition: $β = 91.5°$.

As show in FIG. 3, the two first wedge abutment surfaces 60, 62 converge towards each other at an acute first wedge angle α in a direction towards the first cutting edge 48. Stated differently, the two first wedge abutment surfaces 60, 62 are forwardly converging. The two first wedge abutment surfaces 60, 62 are non-parallel. In accordance with some embodiments of the subject matter of the present application, the first wedge angle α can be in the range $35° \leq α \leq 65°$. Preferably, the first wedge angle α can be equal to 50°.

The first mounting arrangement 54 includes a first stopper abutment surface 58 oriented transversely to the at least one first side abutment surface 56. The first stopper abutment surface 58 is designed to abut a corresponding surface in the insert pocket 26 and prevent rotation of the cutting insert 22, 122 about the insert pivot axis G, when the cutting tool 20 is working. In accordance with some embodiments of the subject matter of the present application, the first stopper abutment surface 58 can be planar. The first stopper abutment surface 58 can be parallel to the insert longitudinal axis A. The first stopper abutment surface 58 can be located on a side of the insert median plane M containing the insert upper surface 38. The first stopper abutment surface 58 can be located on the first projection 64. The first stopper abutment surface 58 can face in the first pivot direction $P_F$. The first stopper abutment surface 58 can form an external first stopper side angle θ with the at least one first side abutment surface 56. The first stopper side angle θ can fulfil the condition: $90° \leq θ \leq 100°$. Preferably, the first stopper side angle θ can fulfil the condition: 90°≤θ≤93°. Preferably still, the first stopper side angle θ can fulfil the condition: θ=91.5°.

The first stopper abutment surface 58 is further from the first cutting edge 48 than the two first wedge abutment surfaces 60, 62. In accordance with some embodiments of the subject matter of the present application, the first stopper abutment surface 58 can be further from the first cutting edge 48 than the through bore axis T. The first stopper abutment surface 58 can be further from the first cutting edge 48 than the insert pivot axis G. The two first wedge abutment surfaces 60, 62 can be closer to the first cutting edge 48 than the through bore axis T. The first wedge upper abutment surface 60 can be located on a side of the insert median plane M containing the insert upper surface 38. Thus, in certain configurations, the first wedge upper abutment surface 60 can be located on the same side of the insert median plane M as the first stopper abutment surface 58.

In accordance with some embodiments of the subject matter of the present application, the two first wedge abutment surfaces 60, 62 and the first stopper abutment surface 58 can be angularly spaced apart about the through bore axis T. In the configuration with three first side abutment surfaces 56, the two first wedge abutment surfaces 60, 62 and the first stopper abutment surface 58 can be adjacent a respective first side abutment surface 56. Referring to FIG. 4, measured in a direction along the through bore axis T, the first stopper abutment surface 58 can be wider than both of the two first wedge abutment surfaces 60, 62.

In accordance with the first embodiment of the subject matter of the present application (i.e., the double-ended cutting insert 22), the second cutting portion 42*b* includes a second cutting edge 48*b*, formed at the intersection of the insert rear end surface 36 and the insert upper surface 38. The insert upper surface 38 includes a second rake surface 50*b* which extends from the second cutting edge 48*b*.

Referring to FIG. 3A, in accordance with some embodiments of the subject matter of the present application, the double-ended cutting insert 22 can include a second mounting arrangement 54*b* which can have a configuration matching that of first mounting arrangement 54. Specifically, the second mounting arrangement 54*b* can be formed on the insert second side surface 30. It is understood that the second mounting arrangement 54*b* is separate from the insert through bore 52. That is to say, the insert through bore 52 does not constitute any part of the second mounting arrangement 54*b*. The second mounting arrangement 54*b* can include at least one second side abutment surface 56*b* which faces away from the insert first side surface 28. The second mounting arrangement 54*b* can include two opposite-facing second wedge abutment surfaces 60*b*, 62*b* oriented transversely to the at least one second side abutment surface 56*b* and converging towards each other in a direction towards the second cutting edge 48*b* at a second wedge angle αb. The two second wedge abutment surfaces 60*b*, 62*b* can be closer to the second cutting edge 48*b* than the second stopper abutment surface 58*b*. The two second wedge abutment surfaces 60*b*, 62*b* can be closer to the second cutting edge 48*b* than the through bore axis T. The second mounting arrangement 54*b* can include a second stopper abutment surface 58*b* oriented transversely to the at least one second side abutment surface 56*b*. The second mounting arrangement 54*b* can be identical to the first mounting arrangement 54.

In accordance with some embodiments of the subject matter of the present application, the double-ended cutting insert 22 can exhibit 180° rotational symmetry about an insert vertical axis V oriented perpendicular to the insert longitudinal axis A and extending through the insert upper and lower surfaces 38, 40. The insert vertical axis V can be perpendicular to, and intersect, the through bore axis T. The insert vertical axis V and insert longitudinal axis A may define the insert axial plane P. The double-ended cutting insert 22 can be devoid of mirror symmetry in the insert axial plane P.

Figure 8:
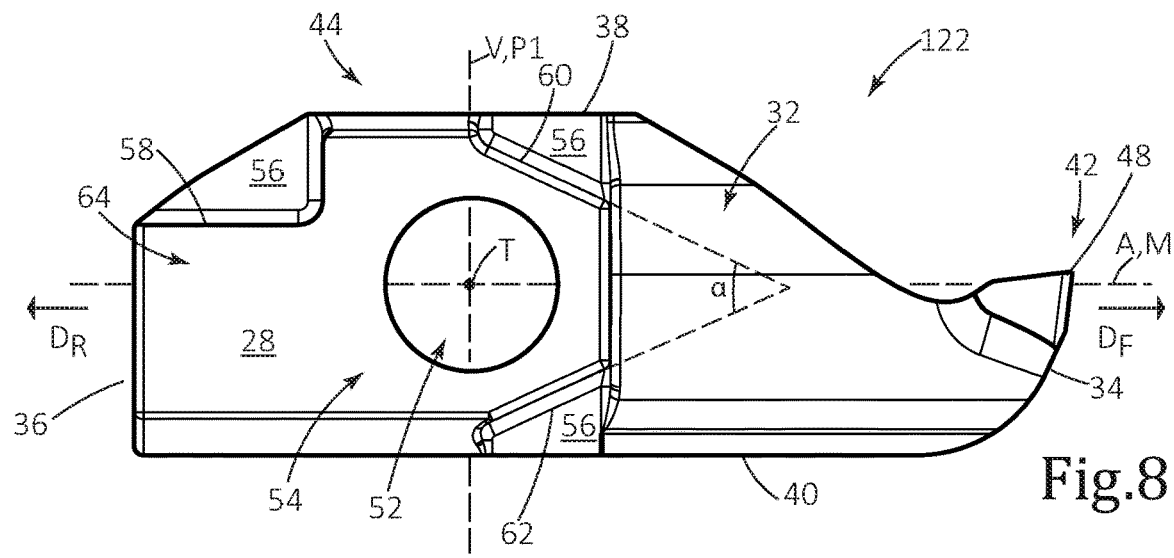
FIG. 8 is a side view of the cutting insert shown in FIG. 7.
Figure 9:
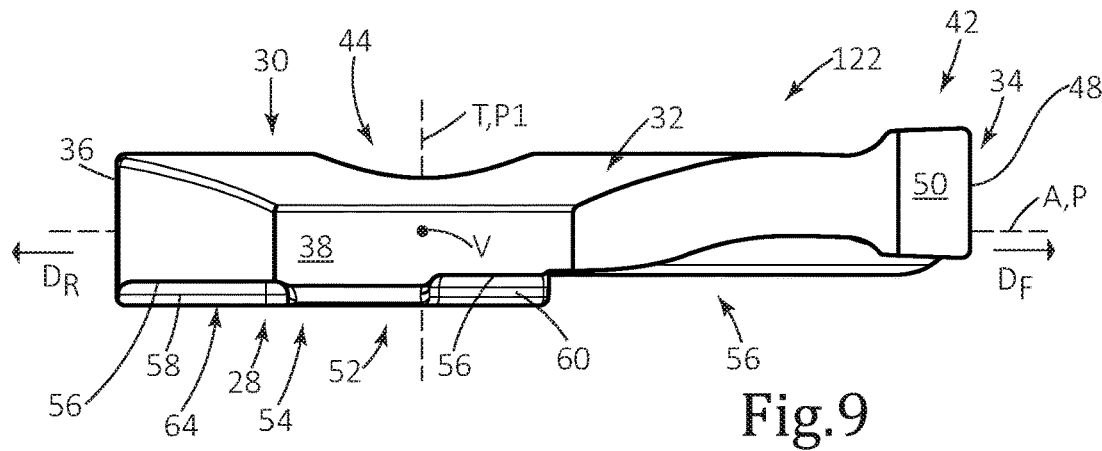
FIG. 9 is a top view of the cutting insert shown in FIG. 7.

The insert vertical axis V and the through bore axis T may define an insert vertical plane P1. As seen in FIGS. 3 and 8, in a side view of the cutting insert 22, 122, the two first wedge abutment surfaces 60, 62 and the first stopper abutment surface 58 can be on opposites sides of the insert vertical plane P1. As seen in FIG. 3, the second wedge abutment surfaces 60*b*, 62*b* and the second stopper abutment surface 58*b* can also be on opposite sides of the inset vertical plane P1.

Figure 10:
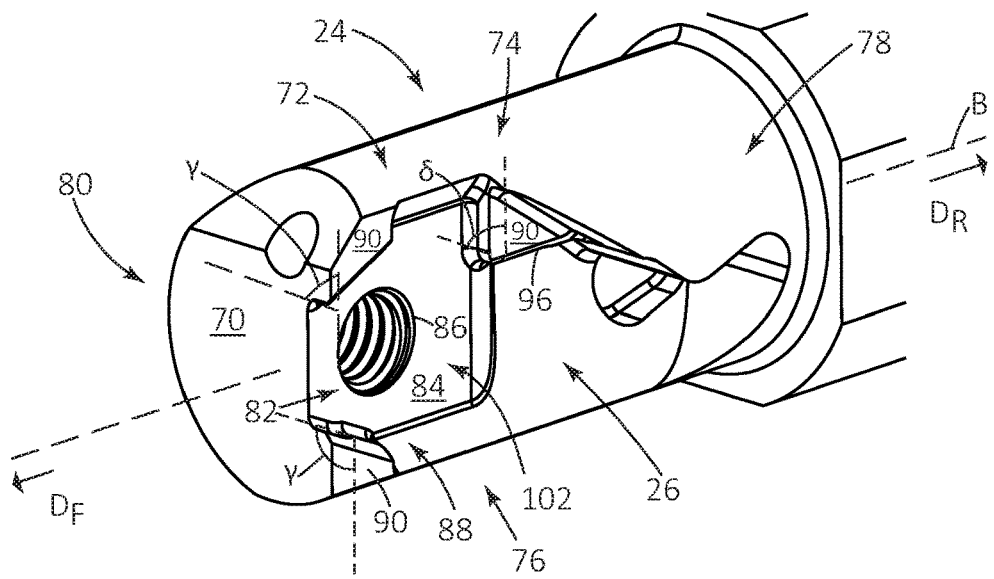
FIG. 10 is a perspective view of an insert pocket.
Figure 11:
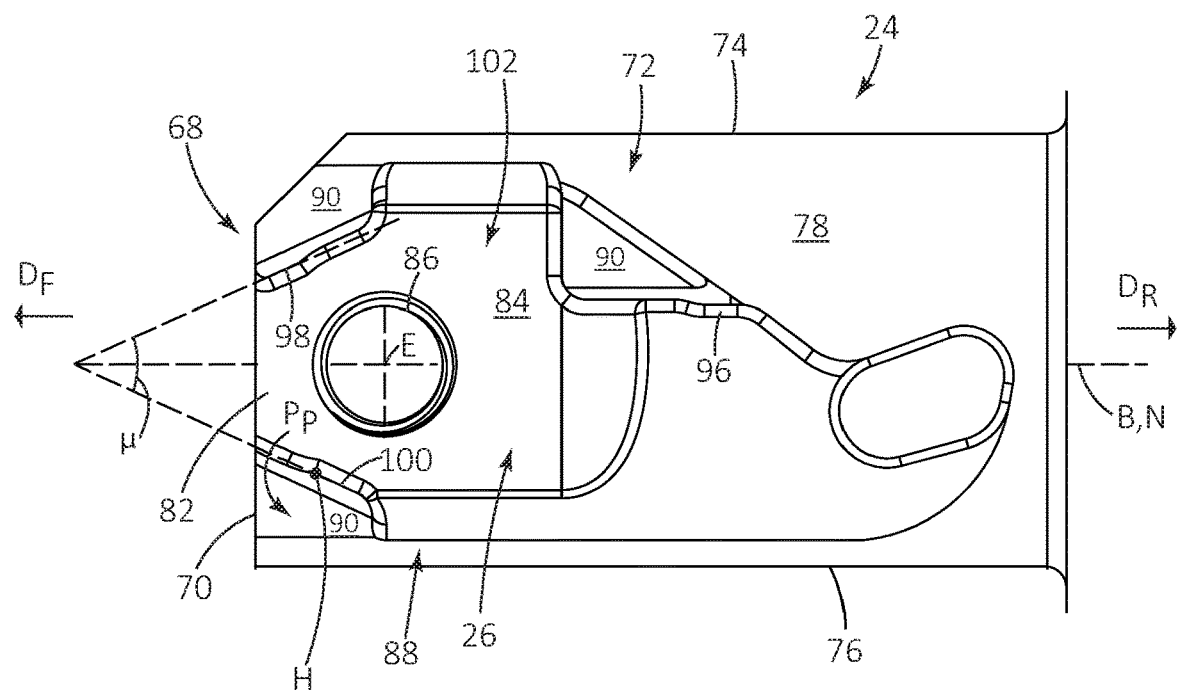
FIG. 11 is a side view of the insert pocket shown in FIG. 10.
Figure 12:
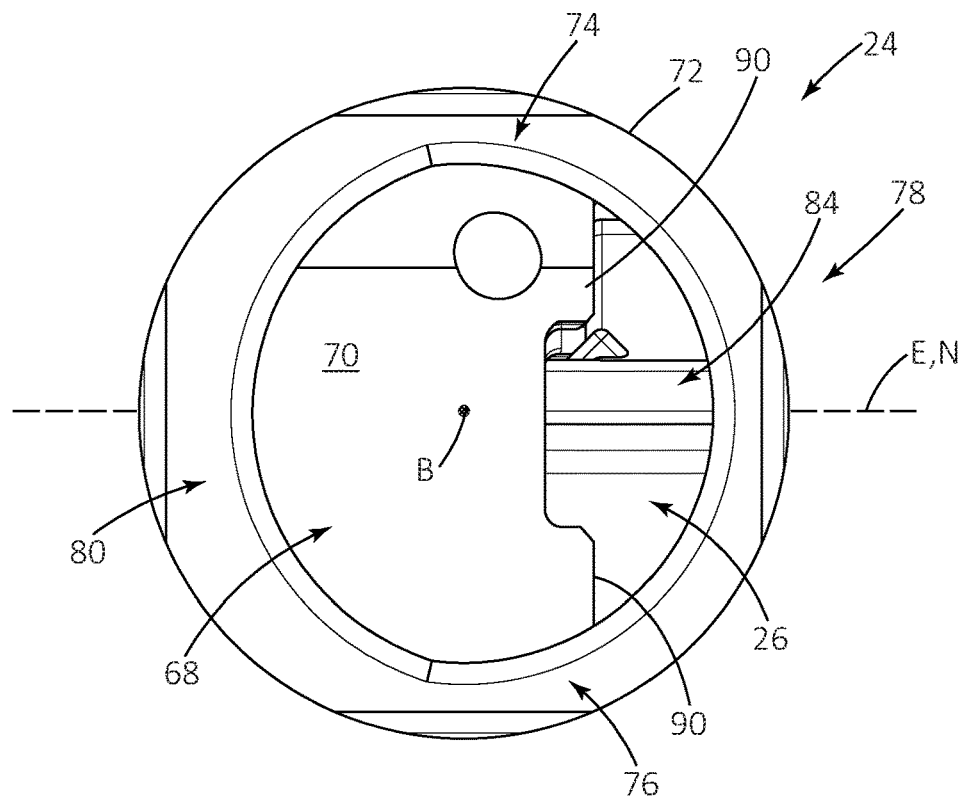
FIG. 12 is a front view of the insert pocket shown in FIG. 10.

A second aspect of the subject matter of the present application relates to the insert holder 24 configured to hold either cutting inset 22, 122. Reference is now made to FIGS. 10-12, showing the insert holder 24, having a holder longitudinal axis B. The holder longitudinal axis B can extend in the same direction as the insert longitudinal axis A, so that the forward and rearward directions $D_F$, $D_R$ are directed along the holder longitudinal axis B. The insert holder 24 has a holder forward end 68. The insert holder 24 includes a holder forward end surface 70, formed at the holder forward end 68, and a holder peripheral surface 72, where the holder peripheral surface 72 forms a circumferential boundary of the holder forward end surface 70. The holder peripheral surface 72 extends about the holder longitudinal axis B.

Referring to FIGS. 11 and 12, the holder peripheral surface 72 at the holder forward end 68 includes opposing holder pocket near-side and far-side surfaces 78, 80. In accordance with some embodiments of the subject matter of the present application, the pocket peripheral surface 32 at the holder forward end 68 can include opposing holder upper and lower surfaces 74, 76 connecting the holder pocket near-side and far-side surfaces 78, 80. In this non-limiting example shown in the drawings, the holder peripheral surface 72 at the holder forward end 68 can be generally cylindrical, in which case the holder pocket near-side and far-side surfaces 78, 80 and the holder upper and lower surfaces 74, 76 smoothly merge with each other and there is only one continuous holder peripheral surface 72. However, it will be understood that the holder peripheral surface 72 can include a plurality, for example four, holder peripheral sub-surfaces.

The insert pocket 26 is recessed in the holder peripheral surface 72, specifically the holder pocket near-side surface 78, and includes a pocket opening 82 that opens out to the holder forward end surface 70 (thus, the insert pocket 26 is forwardly disposed). The purpose of the insert pocket 26 is to accommodate the cutting insert 22, 122 when removably attached to the insert holder 24. The insert pocket 26 includes a pocket base surface 84.

The pocket base surface 84 includes a threaded pocket bore 86. Stated differently, the threaded pocket bore 86 opens out to the pocket base surface 84. The threaded pocket bore 86 extends along a threaded bore axis E. The threaded pocket bore 86 is designed for providing a means to removably attach the cutting insert 22, 122 to the insert holder 24. The insert holder 24 has a holder median plane N which contains the holder longitudinal axis B and the threaded bore axis E.

The insert pocket 26 includes a pocket mounting arrangement 88 formed on the pocket base surface 84. It is understood that the pocket mounting arrangement 88 is separate from the threaded pocket bore 86. That is to say, the threaded pocket bore 86 does not constitute any part of the second mounting arrangement 54.

The pocket mounting arrangement 88 includes at least one pocket side abutment surface 90 which faces away from the holder pocket far-side surface 80. In accordance with some embodiments of the subject matter of the present application, the at least one pocket side abutment surface 90 can be planar. The at least one pocket side abutment surface 90 can include three spaced apart pocket side abutment surfaces 90. The three pocket side abutment surfaces 90 can be angularly spaced apart about the threaded bore axis E. The three pocket first side abutment surfaces 90 can be parallel, and optionally co-planar, with each other.

In accordance with some embodiments of the subject matter of the present application, the pocket mounting arrangement 88 can include a pocket recess 102 recessed in a direction away from the at least one pocket side abutment surface 90. The purpose of the pocket recess 102 is described later in the description. In accordance with some embodiments of the subject matter of the present application, the pocket recess 102 can be recessed from the at least one pocket side abutment surface 90. The threaded pocket bore 86 can open out to a trough portion of the pocket 15 recess 102.

The pocket mounting arrangement 88 includes two opposite-facing pocket wedge abutment surfaces 98, 100. As seen in a side view of the insert holder 24 (e.g., FIG. 11), the two opposite-facing pocket wedge abutment surfaces 98, 100 are located on opposite sides of the holder median plane N and face in generally opposite directions. In accordance with some embodiments of the subject matter of the present application, the two pocket wedge abutment surfaces 98, 100 can include a pocket wedge upper abutment surface 98 and a pocket wedge lower abutment surface 100, whereby the pocket wedge upper abutment surface 98 is closer to the holder upper surface 74 than the pocket wedge lower abutment surface 100. The pocket wedge upper abutment surface 98 can be further forward than the pocket wedge lower abutment surface 100. Referring to FIG. 15, the insert holder 24 can include a pocket pivot axis H which extends through the holder pocket near-side and far-side surfaces 78, 80 and intersects the pocket wedge lower abutment surface 100. A pocket pivot direction $P_P$ about the pocket pivot axis H is defined by the cutting force F.

The two pocket wedge abutment surfaces 98, 100 are oriented transversely to the at least one pocket side abutment surface 90. In accordance with some embodiments of the subject matter of the present application, the two pocket wedge abutment surfaces 98, 100 can face towards each other. The two pocket wedge abutment surfaces 98, 100 can be located in the pocket recess 102.

In accordance with some embodiments of the subject matter of the present application, the two pocket wedge abutment surfaces 98, 100 can be planar. The two pocket wedge abutment surfaces 98, 100 can each form an internal pocket wedge side angle γ with the at least one pocket side abutment surface 90. Each pocket wedge side angle γ can fulfil the condition: $90° \leq \gamma \leq 100°$. Preferably, each pocket wedge side angle γ can fulfil the condition: $90° \leq \gamma \leq 93°$. Preferably still, each pocket wedge side angle γ can fulfil the condition: γ=90°. The pocket wedge side angle γ can be less than the first wedge side angle β.

As seen in FIG. 11, the two pocket wedge abutment surfaces 98, 100 converge towards each other at an acute pocket wedge angle μ in a direction towards the pocket opening 82. Stated differently, the two pocket wedge abutment surfaces 98, 100 are forwardly converging. The two pocket wedge abutment surfaces 98, 100 are non-parallel. In accordance with some embodiments of the subject matter of the present application, the pocket wedge angle μ can be in the range $35° \leq \mu \leq 65°$. Preferably, the pocket wedge angle μ can be equal to 50°. The pocket wedge angle μ can be equal to the insert wedge angle θ.

The pocket mounting arrangement 88 includes a pocket stopper abutment surface 96 oriented transversely to the at least one pocket side abutment surface 90. In accordance with some embodiments of the subject matter of the present application, the pocket stopper abutment surface 96 can be planar. The pocket stopper abutment surface 96 can be parallel to the holder longitudinal axis B. The pocket stopper abutment surface 96 can be located on a side of the holder median plane N containing the holder upper surface 74. The pocket stopper abutment surface 96 can be located in the pocket recess 102. The pocket stopper abutment surface 96 can face opposite the pocket pivot direction $P_P$. The pocket stopper abutment surface 96 can form an internal pocket stopper side angle δ with the at least one pocket side abutment surface 90. The pocket stopper side angle δ can fulfil the condition: $90° \leq \delta \leq 100°$. Preferably, pocket stopper side angle δ can fulfil the condition: $90° \leq \delta \leq 93°$. Preferably still, the pocket stopper side angle δ can fulfil the condition: δ=90°. The pocket stopper side angle δ can be less than the first stopper side angle θ.

The pocket stopper abutment surface 58 is further from the pocket opening 82 than the two pocket wedge abutment surfaces 98, 100. In accordance with some embodiments of the subject matter of the present application, the pocket stopper abutment surface 58 can be further from the pocket opening 82 than the threaded bore axis E. The pocket stopper abutment surface 58 can be further from the pocket opening 82 than the pocket pivot axis H. The two pocket wedge abutment surfaces 98, 100 can be closer to the pocket opening 82 than the threaded bore axis E. The pocket wedge upper abutment surface 98 can be located on a side of the holder median plane N containing the holder upper surface 74. Thus, in certain configurations, the pocket wedge upper abutment surface 98 can be located on the same side of the holder median plane N as the pocket stopper abutment surface 96.

In accordance with some embodiments of the subject matter of the present application, the two pocket wedge abutment surfaces 98, 100 and the pocket stopper abutment surface 96 can be angularly spaced apart about the threaded bore axis E. In the configuration with three pocket side abutment surfaces 90, the two pocket wedge abutment surfaces 98, 100 and the pocket stopper abutment surface 96 can be adjacent a respective pocket side abutment surface 90. Measured in a direction along the threaded bore axis E, the pocket stopper abutment surface 96 can be wider than both of the two pocket wedge abutment surfaces 98, 100.

Figure 13:
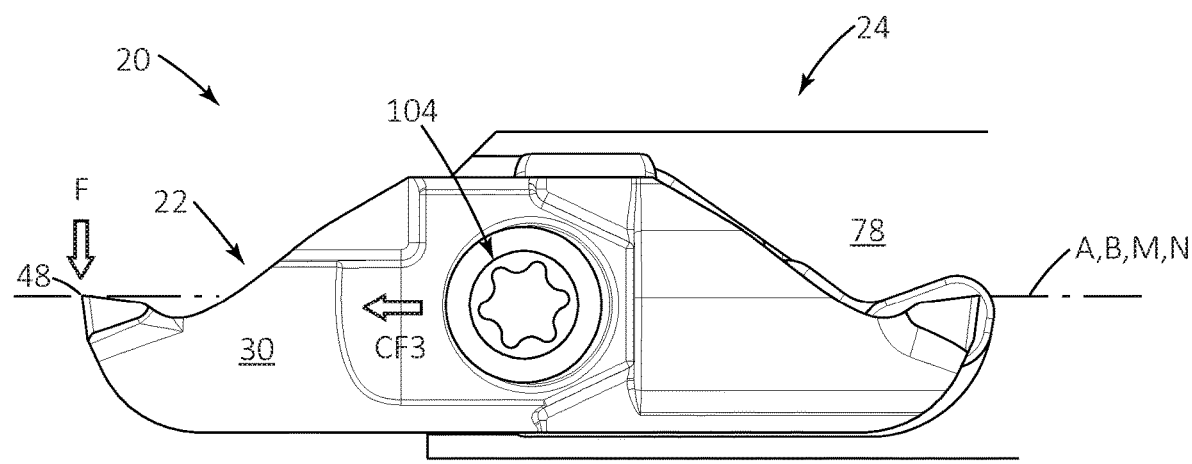
FIG. 13 is a side view of the forward end of the cutting tool, shown in FIG. 1.
Figure 14:
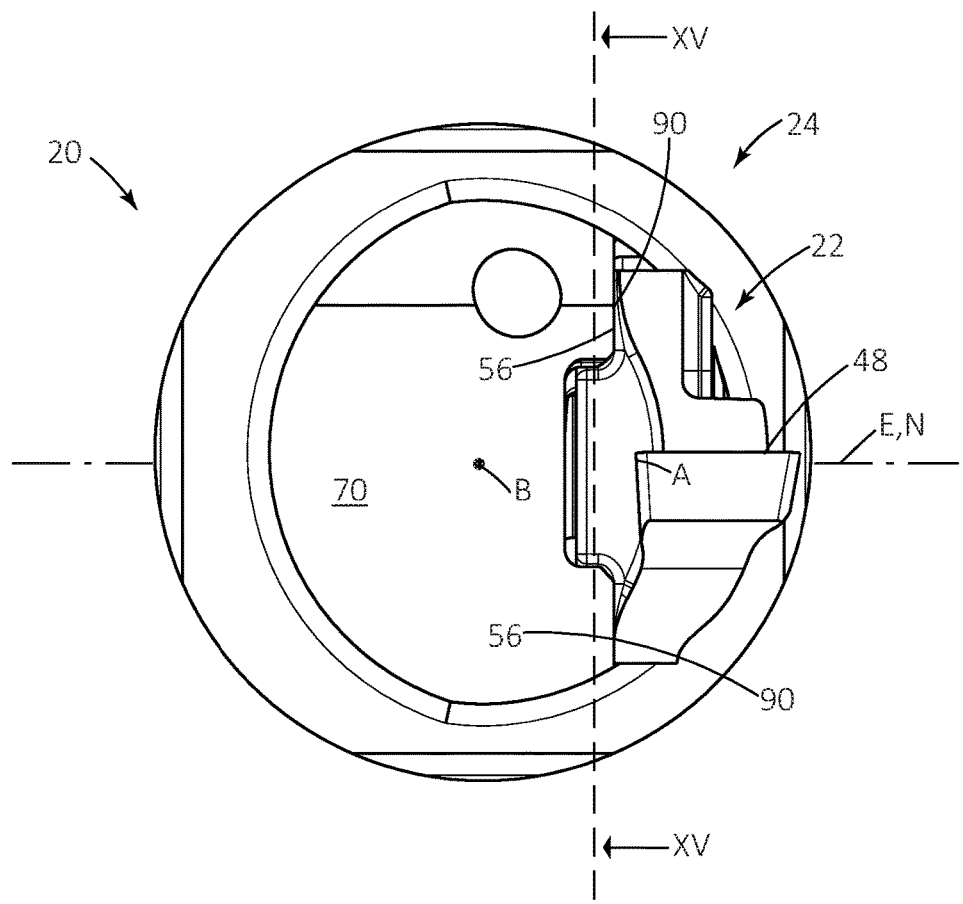
FIG. 14 is a front view of the cutting tool.

Referring to FIGS. 13 and 14, a third aspect of the subject matter of the present application relates to the cutting tool 20. In an assembled position of the cutting tool 20, the cutting insert 22, 122 is removably attached to the insert holder 24 by a fastening member 104. In accordance with some embodiments of the subject matter of the present application the fastening member 104 can be a retaining screw, that is located in the insert through bore 52 and threadingly engaged with the threaded pocket bore 86. The insert through bore 52 and the threaded pocket bore 86 may be eccentric with respect to each other, such that a component of the clamping force CF3 can be directed forwardly, thereby urging the two first wedge abutment surfaces 60, 62 into firm wedge contact with the two pocket wedge abutment surfaces 98, 100.

Referring to FIG. 15, in accordance with some embodiments of the subject matter of the present application, contact between the first wedge upper abutment surface 60 and the pocket wedge upper abutment surface 98 can generate a force on the cutting insert 22, 122 schematically represented by block arrow CF1. Contact between the first wedge lower abutment surface 62 and the pocket wedge lower abutment surface 100 can generate a force on the cutting insert 22, 122 schematically represented by block arrow CF2. Forces CF1 and CF2 generate a torque represented by circular block arrow T'. Torque T' operates to rotate cutting insert 22, 122 and forcibly press the first stopper abutment surface 58 against the pocket stopper abutment surface 96. As a result, when the fastening member 104 clamps the cutting insert 22, 122 in the insert pocket 26, the cutting insert 22, 122 is stably mounted in the insert pocket 26 and accurately positioned relative to insert holder 24.

In this non-limiting example shown in the drawings, showing a right-handed grooving tool, the retaining screw can have a left-handed thread. In such a configuration, the above-mentioned rotation of the cutting insert 22, 122 is complemented by the tightening of the retaining screw, when the head of the retaining screw comes into contact with the cutting insert 22, 122. Similarly, for left-handed grooving tools, the retaining screw can have a right-handed thread to achieve the same result.

In the assembled position of cutting tool 20, the first projection 64 is located in the pocket recess 102. The pocket stopper abutment surface 96 abuts the first stopper abutment surface 58, each pocket wedge abutment surface 98, 100 abuts a respective first wedge abutment surface 60, 62, and the at least one pocket side abutment surface 90 abuts the at least one first side abutment surface 56. The insert longitudinal axis A is parallel to, and off-set from, the holder longitudinal axis B. The insert pivot axis G is co-incident with the pocket pivot axis H. In the configuration with three first side abutment surfaces 56 and three pocket side abutment surfaces 90, each of the pocket side abutment surfaces 90 can abut a respective one of the first side abutment surfaces 56. In accordance with some embodiments of the subject matter of the present application, the insert upper and lower surfaces 38, 40 and the insert front and rear surfaces 34, 36 can be spaced apart from any and all surfaces of the insert pocket 26.

It is noted that stopper abutment surfaces 58, 96 are spaced apart from, and distinct from, their corresponding converging wedge abutment surfaces 60, 62, 98, 100. The stopper abutment surfaces 58, 96 are relatively far from their respective pivot points (compared with, for example, U.S. Pat. No. 7,682,109) and thus provide improved prevention against rotation. It is further noted that both the single-ended and double-ended cutting inserts 22, 122 are retainable in the same insert pocket 26.

As seen in the present figures, the opposite-facing first wedge abutment surfaces 60, 62 face in generally opposite directions, away from one another and away from the insert median plane M, while the opposite-facing pocket wedge abutment surfaces 98, 100 face in generally opposite directions, towards one another and towards the holder median plane N. However, the subject matter of the present application also contemplates embodiments (not shown) in which this is reversed. In such alternate embodiments, the opposite-facing first wedge abutment surfaces 60, 62 may instead face towards one another and towards the insert median plane M, while the opposite-facing pocket wedge abutment surfaces 98, 100 may face away from one another and away from the holder median plane N.

Although the subject matter of the present application has been described to a certain degree of particularity, it should be understood that various alterations and modifications could be made without departing from the spirit or scope of the invention as hereinafter claimed.

What is claimed is:

1. A replaceable cutting insert (22, 122) having an insert longitudinal axis (A) defining opposite forward and rearward directions ($D_F$, $D_R$), the cutting insert (22, 122) comprising:
   opposing insert front and rear end surfaces (34, 36) and an insert peripheral surface (32) extending therebetween, the insert peripheral surface (32) comprising opposing insert first and second side surfaces (28, 30) and opposing insert upper and lower surfaces (38, 40) connecting the insert first and second side surfaces (28, 30);
   a forwardly disposed first cutting portion (42) comprising a first cutting edge (48) formed at the intersection of the insert front end surface (34) and the insert upper surface (38);
   a rearwardly disposed second cutting portion (42b) comprising a second cutting edge (48b) formed at the intersection of the insert rear end surface (36) and the insert upper surface (38); and
   a mounting portion (44) connected to the first cutting portion (42) and the second cutting portion (42b), the mounting portion comprising:
      an insert through bore (52) extending along a through bore axis (T) and opening out to the insert first and second side surfaces (28, 30); and
      a first mounting arrangement (54) formed on the insert first side surface (28) and comprising:
         at least one first side abutment surface (56) facing away from the insert second side surface (30);
         a first stopper abutment surface (58) oriented transversely to the at least one first side abutment surface (56); and
         two opposite-facing first wedge abutment surfaces (60, 62) oriented transversely to the at least one first side abutment surface (56) and converging towards each other at an acute first wedge angle ($\alpha$) in a direction towards the first cutting edge (48);
      a second mounting arrangement (54b) formed on the insert second side surface (30) and comprising:
         at least one second side abutment surface (56b) facing away from the insert first side surface (28);
         a second stopper abutment surface (58b) oriented transversely to the at least one second side abutment surface (56b); and
         two opposite-facing second wedge abutment surfaces (60b, 62b) oriented transversely to the at least one second side abutment surface (56b) and converging towards each other in a direction towards the second cutting edge (48b) at a second wedge angle ($\alpha b$); wherein:
   the first stopper abutment surface (58) is spaced apart from, and distinct from, both of the two first wedge abutment surfaces (60, 62);
   the first stopper abutment surface (58) is further from the first cutting edge (48) than the two first wedge abutment surfaces (60, 62);

the second stopper abutment surface (58*b*) is spaced apart from, and distinct from, both of the two second wedge abutment surfaces (60*b*, 62*b*); and the two second wedge abutment surfaces 60*b*, 62*b*) are closer to the second cutting edge (48*b*) than the second stopper abutment surface (58*b*).

2. The cutting insert (22, 122) according to claim 1, wherein:
the first wedge angle ($\alpha$) is in the range $35°\leq\alpha\leq65°$.

3. The cutting insert (22, 122) according to claim 1, wherein the two first wedge abutment surfaces (60, 62) are planar.

4. The cutting insert (22, 122) according to claim 1, wherein the first stopper abutment surface (58) is planar.

5. The cutting insert (22, 122) according to claim 4, wherein the first stopper abutment surface (58) is parallel to the insert longitudinal axis (A).

6. The cutting insert (22, 122) according to claim 1, wherein:
the two first wedge abutment surfaces (60, 62) comprise a first wedge upper abutment surface (60) and a first wedge lower abutment surface (62), the first wedge upper abutment surface (60) being closer to the insert upper surface (38) than the first wedge lower abutment surface (62).

7. The cutting insert (22, 122) according to claim 6, further comprising:
an insert median plane (M) containing the insert longitudinal axis (A) and the through bore axis (T); wherein:
the first stopper abutment surface (58) is located on the same side of the insert median plane (M) as the first wedge upper abutment surface (60).

8. The cutting insert (22, 122) according to claim 6, wherein:
the cutting insert (22, 122) further comprises an insert pivot axis (G) extending through the insert first and second side surfaces (28, 30) and intersecting the first wedge lower abutment surface (62), about which a first pivot direction ($P_F$) is defined by a cutting force (F) applied to the first cutting edge (48); and
the first stopper abutment surface (58) faces in the first pivot direction ($P_F$).

9. The cutting insert (22, 122) according to claim 1, wherein:
the two first wedge abutment surfaces (60, 62) face away from each other.

10. The cutting insert (22, 122) according to claim 1, wherein:
the first mounting arrangement (54) further comprises a first projection (64) projecting in a direction away from the at least one first side abutment surface (56); and
the two first wedge abutment surfaces (60, 62) are located on the first projection (64).

11. The cutting insert (22, 122) according to claim 10, wherein:
the first stopper abutment surface (58) is located on the first projection (64).

12. The cutting insert (22, 122) according to claim 1, wherein the two first wedge abutment surfaces (60, 62) and the first stopper abutment surface (58) are angularly spaced apart about the through bore axis (T).

13. The cutting insert (22, 122) according to claim 1, wherein:
the at least one first side abutment surface (56) comprises three spaced apart first side abutment surfaces (56), the three first side abutment surfaces (56) being angularly spaced apart about the through bore axis (T).

14. The cutting insert (22, 122) according to claim 1 wherein:
the at least one first side abutment surface (56) is planar.

15. The cutting insert (22, 122) according to claim 14, wherein:
the two first wedge abutment surfaces (60, 62) are planar; and
the two first wedge abutment surfaces (60, 62) each form an external first wedge side angle (B) with the at least one first side abutment surface (56), each first wedge side angle ($\beta$) fulfilling the condition: $90°\leq\beta\leq100°$.

16. The cutting insert (22, 122) according to claim 14, wherein:
the first stopper abutment surface (58) is planar; and
the first stopper abutment surface (58) forms an external first stopper side angle ($\theta$) with the at least one first side abutment surface (56), the first stopper side angle ($\theta$) fulfilling the condition: $90°\leq\theta\leq100°$.

17. The cutting insert (22, 122) according to claim 1 wherein:
measured in a direction along the through bore axis (T), the first stopper abutment surface (58) is wider than both of the two first wedge abutment surfaces (60, 62).

18. The cutting insert (22) according to claim 1, wherein the cutting insert (22) exhibits 180° rotational symmetry about an insert vertical axis (V) oriented perpendicular to the insert longitudinal axis (A) and extending through the insert upper and lower surfaces (38, 40).

19. An insert holder (24) having a holder longitudinal axis (B) defining opposite forward and rearward directions ($D_F$, $D_R$), the insert holder (24) comprising:
a holder forward end surface (70) and a holder peripheral surface (72) forming a circumferential boundary thereof, the holder peripheral surface (72) extending about the holder longitudinal axis (B) and comprising at a holder forward end (68) opposing holder pocket near-side and far-side surfaces (78, 80); and
a forwardly disposed insert pocket (26) recessed in the holder pocket near-side surface (78), the insert pocket (26) comprising:
a pocket opening (82) that opens out to the holder forward end surface (70);
a pocket base surface (84);
a threaded pocket bore (86) extending along a threaded bore axis (E) and opening out to the pocket base surface (84);
a pocket mounting arrangement (88) formed on the pocket base surface (84) and comprising:
at least one pocket side abutment surface (90) facing away from the holder pocket far-side surface (80);
a pocket stopper abutment surface (96) oriented transversely to the at least one pocket side abutment surface (90); and
two opposite-facing pocket wedge abutment surfaces (98, 100) oriented transversely to the at least one pocket side abutment surface (90) and converging towards each other at an acute pocket wedge angle ($\mu$) in a direction towards the pocket opening (82), the two pocket wedge abutment surfaces (98, 100) comprise a pocket wedge upper abutment surface (98) and a pocket wedge lower abutment surface (100), the pocket wedge upper abutment surface (98) being closer to the holder upper surface (74) than the pocket wedge lower abutment surface (100); wherein:

the pocket stopper abutment surface (96) is spaced apart from, and distinct from, both of the two pocket wedge abutment surfaces (98,100);

the pocket stopper abutment surface (96) is further from the pocket opening (82) than the two pocket wedge abutment surfaces (98, 100); and the pocket wedge upper abutment surface (98) is further forward than the pocket wedge lower abutment surface (100).

20. The insert holder (24) according to claim 19, wherein: the pocket wedge angle (μ) is in the range 35°≤μ≤65°.

21. The insert holder (24) according to claim 19, wherein the two pocket wedge abutment surfaces (98, 100) are planar.

22. The insert holder (24) according to claim 19, wherein the pocket stopper abutment surface (96) is planar.

23. The insert holder (24) according to claim 22, wherein the pocket stopper abutment surface (96) is parallel to the holder longitudinal axis (B).

24. The insert holder (24) according to claim 19, further comprising:

a holder median plane (N) containing the holder longitudinal axis (B) and the threaded bore axis (E); wherein:

the pocket peripheral surface (32) at the holder forward end (68) further comprises opposing holder upper and lower surfaces (74, 76) connecting the holder pocket near-side and far-side surfaces (78, 80); and the pocket stopper abutment surface (96) is on the same side of the holder median plane (N) as the pocket wedge upper abutment surface (98).

25. The insert holder (24) according to claim 19, wherein:

the pocket peripheral surface (32) at the holder forward end (68) further comprises opposing holder upper and lower surfaces (74, 76) connecting the holder pocket near-side and far-side surfaces (78, 80);

the insert holder (24) comprises a pocket pivot axis (H) extending through the holder pocket near-side and far-side surfaces (78, 80) and intersecting the pocket wedge lower abutment surface (100), about which a pocket pivot direction ($P_P$) is defined by a cutting force (F) applied to a first cutting edge (48) of a cutting insert (22, 122) removably attached to the insert holder (24) by a fastening member (104); and the pocket stopper abutment surface (96) faces opposite the pocket pivot direction ($P_P$).

26. The insert holder (24) according to claim 19, wherein: the two pocket wedge abutment surfaces (98, 100) face towards each other.

27. The insert holder (24) according to claim 19, wherein: the pocket mounting arrangement (88) further comprises a pocket recess (102) recessed in a direction away from the at least one pocket side abutment surface (90); and the two pocket wedge abutment surfaces (98, 100) are located in the pocket recess (102).

28. The insert holder (24) according to claim 27, wherein: the pocket stopper abutment surface (96) is located in the pocket recess (102).

29. The insert holder (24) according to claim 19, wherein the two pocket wedge abutment surfaces (98, 100) and the pocket stopper abutment surface (96) are angularly spaced apart about the threaded bore axis (E).

30. The insert holder (24) according to claim 19, wherein: the pocket side abutment surface (90) comprises three spaced apart pocket side abutment surfaces (90), the three pocket side abutment surfaces (90), being angularly spaced apart about the threaded bore axis (E).

31. The insert holder (24) according to claim 19, wherein: the at least one pocket side abutment surface (90) is planar.

32. The insert holder (24) according to claim 31, wherein: the two pocket wedge abutment surfaces (98, 100) are planar; and the two pocket wedge abutment surfaces (98, 100) each form an internal pocket wedge side angle (γ) with the pocket side abutment surface (90), each pocket wedge side angle (γ) fulfilling the condition: 90°≤γ≤100°.

33. The insert holder (24) according to claim 31, wherein: the pocket stopper abutment surface (96) is planar; and the pocket stopper abutment surface (96) forms an internal pocket stopper side angle (δ) with the pocket side abutment surface (90), the pocket stopper side angle (δ) fulfilling the condition: 90°≤δ≤100°.

34. The insert holder (24) according to claim 19, wherein: measured in a direction along the threaded bore axis (E), the pocket stopper abutment surface (96) is wider than both of the two pocket wedge abutment surfaces (98, 100).

35. A cutting tool (20) comprising, in combination:

an insert holder (24) having a holder longitudinal axis (B) defining opposite forward and rearward directions ($D_F$, $D_R$); and a cutting insert (22, 122), in accordance with claim 1, removably attached to the insert holder (24) by a fastening member (104).

36. The cutting tool (20) according to claim 35, wherein the insert holder (24) comprises:

a holder forward end surface (70) and a holder peripheral surface (72) forming a circumferential boundary thereof, the pocket peripheral surface (72) extending about the holder longitudinal axis (B) and comprising at the holder forward end (68) opposing holder pocket near-side and far-side surfaces (78, 80); and a forwardly disposed insert pocket (26) recessed in the holder pocket near-side surface (78), the insert pocket comprising:

a pocket opening (82) that opens out to the holder forward end surface (70);

a pocket base surface (84);

a threaded pocket bore (86) extending along a threaded bore axis (E) and opening out to the pocket base surface (84);

a pocket mounting arrangement (88) formed on the pocket base surface (84) and comprising:

at least one pocket side abutment surface (90) facing away from the holder pocket far-side surface (80);

a pocket stopper abutment surface (96) oriented transversely to the at least one pocket side abutment surface (90); and two opposite-facing pocket wedge abutment surfaces (98, 100) oriented transversely to the at least one pocket side abutment surface (90) and converging towards each other at an acute pocket wedge angle (μ) in a direction towards the pocket opening (82);

wherein:

the pocket stopper abutment surface (96) is spaced apart from, and distinct from, both of the two pocket wedge abutment surfaces (98,100); and the pocket stopper abutment surface (96) is further from the pocket opening (82) than the two pocket wedge abutment surfaces (98, 100).

37. The cutting tool (20) according to claim 36, wherein: each pocket wedge abutment surface (98,100) abuts a respective first wedge abutment surface (60, 62), the pocket stopper abutment surface (96) abuts the first stopper abutment surface (58) and the at least one pocket side abutment surface (90) abuts the at least one first side abutment surface (56).

38. The cutting tool (20) according to claim 37, wherein: the fastening member (104) is a retaining screw that is located in the insert through bore (52) and threadingly engaged with the threaded pocket bore (86).

39. The cutting tool (20) according to claim 37, wherein the insert upper and lower surfaces surface (38, 40) and the insert front and rear surfaces (34, 36) are spaced apart from any and all surfaces of the insert pocket (26).

40. The cutting tool (20) according to claim 37, wherein the insert wedge angle (θ) is equal to the pocket wedge angle (μ).

41. A replaceable cutting insert (22, 122) having an insert longitudinal axis (A) defining opposite forward and rearward directions ($D_F$, $D_R$), the cutting insert (22, 122) comprising:
   opposing insert front and rear end surfaces (34, 36) and an insert peripheral surface (32) extending therebetween, the insert peripheral surface (32) comprising opposing insert first and second side surfaces (28, 30) and opposing insert upper and lower surfaces (38, 40) connecting the insert first and second side surfaces (28, 30);
   a forwardly disposed first cutting portion (42) comprising a first cutting edge (48) formed at the intersection of the insert front end surface (34) and the insert upper surface (38); and
   a mounting portion (44) connected to the first cutting portion (42), the mounting portion comprising:
      an insert through bore (52) extending along a through bore axis (T) and opening out to the insert first and second side surfaces (28, 30); and
      a first mounting arrangement (54) formed on the insert first side surface (28) and comprising:
         three spaced apart first side abutment surfaces (56) facing away from the insert second side surface (30), the three first side abutment surfaces (56) being angularly spaced apart about the through bore axis (T);
         a first stopper abutment surface (58) oriented transversely to the first side abutment surfaces (56); and
         two opposite-facing first wedge abutment surfaces (60, 62) oriented transversely to the first side abutment surfaces (56) and converging towards each other at an acute first wedge angle (α) in a direction towards the first cutting edge (48); wherein:
   the first stopper abutment surface (58) is spaced apart from, and distinct from, both of the two first wedge abutment surfaces (60, 62); and
   the first stopper abutment surface (58) is further from the first cutting edge (48) than the two first wedge abutment surfaces (60, 62).

42. A cutting tool (20) comprising:
   an insert holder (24) having a holder longitudinal axis (B) defining opposite forward and rearward directions ($D_F$, $D_R$), the insert holder 24 comprising:
      a holder forward end surface (70) and a holder peripheral surface (72) forming a circumferential boundary thereof, the holder peripheral surface (72) extending about the holder longitudinal axis (B) and comprising at the holder forward end (68) opposing holder pocket near-side and far-side surfaces (78, 80); and
      a forwardly disposed insert pocket (26) recessed in the holder pocket near-side surface (78), the insert pocket comprising:
         a pocket opening (82) that opens out to the holder forward end surface (70);
         a pocket base surface (84);
         a threaded pocket bore (86) extending along a threaded bore axis (E) and opening out to the pocket base surface (84);
         a pocket mounting arrangement (88) formed on the pocket base surface (84) and comprising:
            at least one pocket side abutment surface (90) facing away from the holder pocket far-side surface (80);
            a pocket stopper abutment surface (96) oriented transversely to the at least one pocket side abutment surface (90); and
            two opposite-facing pocket wedge abutment surfaces (98, 100) oriented transversely to the at least one pocket side abutment surface (90) and converging towards each other at an acute pocket wedge angle (μ) in a direction towards the pocket opening (82), the pocket stopper abutment surface (96) spaced apart from, and distinct from, both of the two pocket wedge abutment surfaces (98,100), the pocket stopper abutment surface (96) further from the pocket opening (82) than the two pocket wedge abutment surfaces (98, 100); and
   a cutting insert (22, 122), removably attached to the insert holder (24) by a fastening member (104), the cutting insert (22, 122) having an insert longitudinal axis (A) and comprising:
      opposing insert front and rear end surfaces (34, 36) and an insert peripheral surface (32) extending therebetween, the insert peripheral surface (32) comprising opposing insert first and second side surfaces (28, 30) and opposing insert upper and lower surfaces (38, 40) connecting the insert first and second side surfaces (28, 30);
      a forwardly disposed first cutting portion (42) comprising a first cutting edge (48) formed at the intersection of the insert front end surface (34) and the insert upper surface (38); and
      a mounting portion (44) connected to the first cutting portion (42), the mounting portion comprising:
         an insert through bore (52) extending along a through bore axis (T) and opening out to the insert first and second side surfaces (28, 30); and
         a first mounting arrangement (54) formed on the insert first side surface (28) and comprising:
            at least one first side abutment surface (56) facing away from the insert second side surface (30);
            a first stopper abutment surface (58) oriented transversely to the at least one first side abutment surface (56); and
            two opposite-facing first wedge abutment surfaces (60, 62) oriented transversely to the at least one first side abutment surface (56) and converging towards each other at an acute first wedge angle (α) in a direction towards the first cutting edge (48), the first stopper abutment surface (58) spaced apart from, and distinct from, both of the two first wedge abutment surfaces (60, 62), the first stopper abutment surface (58) further from the first cutting edge (48) than the two first wedge abutment surfaces (60, 62).

\* \* \* \* \*